(12) United States Patent
Harada et al.

(10) Patent No.: US 12,323,993 B2
(45) Date of Patent: Jun. 3, 2025

(54) TERMINAL FOR CONFIGURING SLOT OFFSET OF UPLINK OR DOWNLINK CHANNEL

(71) Applicant: NTT DOCOMO, INC., Tokyo (JP)

(72) Inventors: Hiroki Harada, Tokyo (JP); Shohei Yoshioka, Tokyo (JP); Shinya Kumagai, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 397 days.

(21) Appl. No.: 17/759,576

(22) PCT Filed: Feb. 13, 2020

(86) PCT No.: PCT/JP2020/005673
§ 371 (c)(1),
(2) Date: Jul. 27, 2022

(87) PCT Pub. No.: WO2021/161486
PCT Pub. Date: Aug. 19, 2021

(65) Prior Publication Data
US 2023/0076328 A1    Mar. 9, 2023

(51) Int. Cl.
*H04W 72/23*    (2023.01)
*H04L 1/1812*   (2023.01)
*H04L 5/00*     (2006.01)

(52) U.S. Cl.
CPC ........... *H04W 72/23* (2023.01); *H04L 1/1812* (2013.01); *H04L 5/0016* (2013.01); *H04L 5/0055* (2013.01)

(58) Field of Classification Search
None
See application file for complete search history.

(56) References Cited

U.S. PATENT DOCUMENTS

| 2018/0288746 | A1* | 10/2018 | Zhang | H04W 72/23 |
| 2019/0223084 | A1* | 7/2019 | John Wilson | H04W 48/10 |
| 2019/0394075 | A1* | 12/2019 | Baldemair | H04W 74/0833 |

(Continued)

FOREIGN PATENT DOCUMENTS

| WO | 2019212628 A1 | 11/2019 |
| WO | WO-2020066854 A1 * | 4/2020 |

OTHER PUBLICATIONS

3GPP TSG RAN Meeting #86; RP-193229 "New WID on Extending current NR operation to 71 GHZ" Qualcomm; Sitges, Spain; Dec. 9-12, 2019 (5 pages).

(Continued)

*Primary Examiner* — Jamaal Henson
(74) *Attorney, Agent, or Firm* — Osha Bergman Watanabe & Burton LLP

(57) ABSTRACT

A terminal includes a receiver that receives configuration information transmitted from a base station in a high frequency band higher than or equal to a frequency band of a Frequency Range 2 (FR2) in a frequency range a New Radio (NR) system formed of a Frequency Range 1 (FR1), which is a low frequency range, and the FR2, which is a high frequency range; and a controller that modifies, based on the configuration information, an interpretation of at least one of a counter DAI and a total DAI in a Downlink Assignment Indicator (DAI) included in control information to be received from the base station.

6 Claims, 12 Drawing Sheets

(56) References Cited

U.S. PATENT DOCUMENTS

| | | | |
|---|---|---|---|
| 2020/0229180 A1* | 7/2020 | Liu | H04L 5/0092 |
| 2020/0252168 A1* | 8/2020 | Kim | H04W 72/1268 |
| 2021/0321446 A1* | 10/2021 | Lee | H04L 5/0044 |
| 2022/0030607 A1* | 1/2022 | Liu | H04W 72/1273 |
| 2022/0039099 A1* | 2/2022 | Faxér | H04W 72/542 |
| 2022/0095353 A1* | 3/2022 | Liu | H04W 72/23 |
| 2022/0159682 A1* | 5/2022 | Liu | H04W 72/23 |
| 2022/0174709 A1* | 6/2022 | Chen | H04L 5/0055 |
| 2022/0255680 A1* | 8/2022 | Moon | H04W 72/21 |

OTHER PUBLICATIONS

3GPP TSG-RAN4 Meeting #92bis; R4-1912870 "WF on the NR-U channel raster on 5GHz band" Ericsson; Chongqing, China; Oct. 14-18, 2019 (10 pages).

3GPP TSG-RAN WG4 #93; R4-1916167 "Draft CR channel raster in band n46 for NR-U operation" Qualcomm Incorporated; Reno, United States; Nov. 18-22, 2019 (3 pages).

3GPP TSG-RAN WG4 Meeting #92bis; R4-1912982 "WF for sync raster for NR-U" Qualcomm Incorporated; Chongqing, China; Oct. 14-18, 2019 (4 pages).

3GPP TSG-RAN WG4 Meeting #93; R4-1915982 "Draft CR for Sync raster design for NR-U in 38.104" Futurewei; Reno, US; Nov. 18-22, 2019 (3 pages).

3GPP TSG RAN WG1#100; R1-2000002 "Highlights from RAN#86" RAN1 Chairman; Athens, Greece; Feb. 24-28, 2020 (5 pages).

3GPP TS 38.101-2 V15.8.0 "3rd Generation Partnership Project; Technical Specification Group Radio Access Network; NR; User Equipment (UE) radio transmission and reception; Part 2: Range 2 Standalone (Release 15)" Dec. 2019 (144 pages).

3GPP TS 38.212 V16.0.0 "3rd Generation Partnership Project; Technical Specification Group Radio Access Network; NR; Multiplexing and channel coding (Release 16)" Dec. 2019 (145 pages).

3GPP TS 38.213 V15.8.0 "3rd Generation Partnership Project; Technical Specification Group Radio Access Network; NR; Physical layer procedures for control (Release 15)" Dec. 2019 (109 pages).

3GPP TS 38.214 V15.7.0 "3rd Generation Partnership Project; Technical Specification Group Radio Access Network; NR; Physical layer procedures for data (Release 15)" Sep. 2019 (106 pages).

3GPP TS 38.331 V15.8.0 "3rd Generation Partnership Project; Technical Specification Group Radio Access Network; NR; Radio Resource Control (RRC) protocol specification (Release 15)" Dec. 2019 (532 pages).

International Search Report issued in International Application No. PCT/JP2020/005673, mailed Sep. 24, 2020 (5 pages).

Written Opinion issued in International Application No. PCT/JP2020/005673; Dated Sep. 24, 2020 (3 pages).

* cited by examiner

FIG.7

| (C-DAI, T-DAI) | | |
|---|---|---|
| DL cell1 | (0, 1) | (2, 3) |
| DL cell2 | (1, 1) | (3, 3) |
| UL cell1 | | |

4 bits

| (0, 1) | (2, 3) | (0, 1) | (2, 3) |
|---|---|---|---|
| (1, 1) | (3, 3) | (1, 1) | (3, 3) |

8 bits

FIG.9

| (C-DAI, T-DAI) | | | | |
|---|---|---|---|---|
| DL cell1 | (0, 3) | (0, 3) | (0, 2) | |
| DL cell2 | (1, 3) | (1, 3) | ~~(1, 2)~~ | |
| DL cell3 | (2, 3) | (2, 3) | (2, 2) | |
| DL cell4 | ~~(3, 3)~~ | (3, 3) | ■ | |
| UL cell1 | | | | |

11 bits

| | | |
|---|---|---|
| (0, 3) | ~~(0, 2)~~ | (0, 2) |
| (1, 3) | ~~(1, 2)~~ | (1, 2) |
| (2, 3) | ~~(2, 2)~~ | (2, 2) |
| (3, 3) | ~~(3, 2)~~ | ■ |

7 bits

But gNB assumes 11 bits

TERMINAL FOR CONFIGURING SLOT OFFSET OF UPLINK OR DOWNLINK CHANNEL

TECHNICAL FIELD

The present invention relates to a terminal and a base station in a radio communication system.

BACKGROUND ART

In new ratio (NR) of Release 15 and NR of Release 16 of a third generation partnership project (3GPP), a frequency band up to the upper limit of 52.6 GHz is the target. With regard to extension of NR to a frequency band higher than or equal to 52.6 GHz, in Release 16, a study item exists at a technical specification group radio access network (TSG RAN) level in which various regulations, use cases, requirements, and the like are to be studied. The study of the study item has been completed in December 2019, and in Release 17, a study item and a work item for actually extending a technical specification to 52.6 GHz or higher have been agreed.

In the study item in Release 16, as an NR frequency band, extension from 52.6 GHz to 114.25 GHz was assumed, but in Release 17, time for the study is limited, and, thus, it is assumed that the frequency band to be studied is limited to a range from 52.6 GHz to 71 GHz. In addition, when extending the NR frequency band from 52.6 GHz to 71 GHz, it is assumed that extension is carried out on the basis of design of current NR frequency range 2 (FR2).

RELATED ART DOCUMENT

Non-Patent Document

Non-Patent Document 1: 3GPP TSG RAN Meeting #86, RP-193229, Sitges, Spain, Dec. 9 to 12, 2019
Non-Patent Document 2: 3GPP TS 38.101-2 V15.8.0 (2019-12)
Non-Patent Document 3: 3GPP TSG-RAN4 Meeting #92bis, R4-1912870, Chongqing, China, 14 to 18 Oct. 2019
Non-Patent Document 4: 3GPP TSG-RAN4 Meeting #93, R4-1916167, Reno, United States, 18 to 22 Nov. 2019
Non-Patent Document 5: 3GPP TSG-RAN4 Meeting #92bis, R4-1912982, Chongqing, China, 14 to 18 Oct. 2019
Non-Patent Document 6: 3GPP TSG-RAN4 Meeting #93, R4-1915982, Reno, US, Nov. 18 to 22, 2019
Non-Patent Document 7: 3GPP TS 38.331 V15.8.0 (2019-12)
Non-Patent Document 8: 3GPP TS 38.213 V15.8.0 (2019-12)
Non-Patent Document 9: 3GPP TS 38.214 V15.7.0 (2019-09)
Non-Patent Document 10: 3GPP TS 38.212 V16.0.0 (2019-12)

SUMMARY OF THE INVENTION

Problem to be Solved by the Invention

DCI includes a Downlink assignment index (DAI) field. The DAI includes a counter DAI and a total DAI.

There is a need for a technique for matching a recognition on a size of a HARQ-ACK codebook between a base station and a terminal.

Means for Solving the Problem

According to an aspect of the present invention, there is provided a terminal including a receiver that receives configuration information transmitted from a base station in a high frequency band higher than or equal to a frequency band of a Frequency Range 2 (FR2) in a frequency range of a New Radio (NR) system formed of a Frequency Range 1 (FR1), which is a low frequency range, and the FR2, which is a high frequency range; and a controller that modifies, based on the configuration information, an interpretation of at least one of a counter DAI and a total DAI in a Downlink Assignment Indicator (DAI) included in control information to be received from the base station.

Advantage of the Invention

A technique is provided that is for matching a recognition on a size of a HARQ-ACK codebook between a base station and a terminal.

BRIEF DESCRIPTION OF DRAWINGS

FIG. 7 illustrates an example of transmitting DAI by including the DAI in DCI.
FIG. 9 illustrates an example of transmitting DAI by including the DAI in DCI.

EMBODIMENTS OF THE INVENTION

Hereinafter, an embodiment of the invention will be described with reference to the accompanying drawings. Note that, the following embodiment is illustrative only, and embodiments to which the invention is applied are not limited to the following embodiments.

It is assumed that a radio communication system in the following embodiments basically conform to NR, but this is merely an example, and the radio communication system in the embodiments may partially or entirely conform to a radio communication system (for example, LTE) other than the NR.

(Overall System Configuration)

Figure 1:
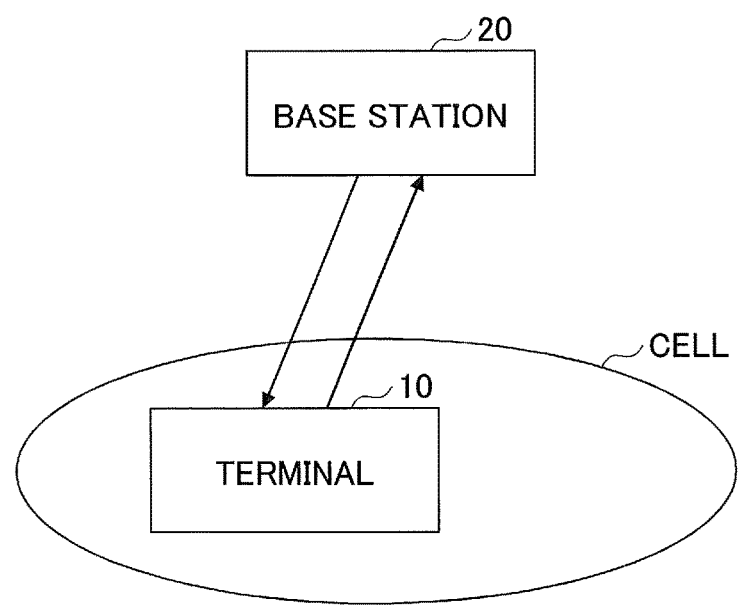
FIG. 1 is a configuration diagram of a communication system in an embodiment.

FIG. 1 illustrates a configuration diagram of the radio communication system according to the embodiments. As illustrated in FIG. 1, the radio communication system according to the embodiments includes a terminal 10 and a base station 20. In FIG. 1, one piece of the terminal 10 and one piece of the base station 20 are illustrated, but this is an example, and a plurality of the terminals 10 and a plurality of the base stations 20 may be provided.

The terminal 10 is a communication device such as a smart phone, a portable telephone, a tablet, a wearable terminal, and a communication module for machine-to-machine (M2M) which have a radio communication function. The terminal 10 receives a control signal or data from the base station 20 in DL, and transmits the control signal or the data to the base station 20 in UL to use various communication services provided by the radio communication system. For example, a channel transmitted from the terminal 10 includes a physical uplink control channel (PUCCH) and a physical uplink shared channel (PUSCH). In addition, the terminal 10 may be referred to as a UE, and the base station 20 may be referred to as a gNB.

In the embodiments, a duplex method may be a time division duplex (TDD) method or a frequency division duplex (FDD) method.

In the embodiments of the present invention, "configure" or "specify" a radio parameter or the like may mean that a predetermined value is pre-configured in the base station 20 or the terminal 10, that a predetermined value is expected to be pre-configured in the base station 20 or the terminal 10, or that a radio parameter transmitted from the base station 20 or the terminal 10 is configured.

The base station 20 is a communication device that provides one or more cells and that performs radio communication with the terminal 10. Physical resources of a radio signal are defined in a time domain and a frequency domain, the time domain may be defined by a number of OFDM symbols, and the frequency domain may be defined by a number of sub-carriers or a number of resource blocks. The base station 20 transmits synchronization signals and system information to the terminal 10. The synchronization signals are, for example, NR-PSS and NR-SSS. A part of the system information is transmitted, for example, by NR-PBCH, and is also called broadcast information. The synchronization signal and broadcast information may be periodically transmitted as an SS block (SS/PBCH block) formed of a predetermined number of OFDM symbols. For example, the base station 20 transmits a control signal or data in Downlink (DL) to the terminal 10 and receives a control signal or data in Uplink (UL) from the terminal 10. Both the base station 20 and the terminal 10 are capable of beam forming to transmit and receive signals. For example, a reference signal transmitted from the base station 20 includes a Channel State Information Reference Signal (CSI-RS) and a channel transmitted from the base station 20 includes a Physical Downlink Control Channel (PDCCH) and a Physical Downlink Shared Channel (PDSCH).

(Multi-Numerology)

In order to support a wide range of frequencies and use cases in 5G, it is necessary to support multiple numerologies (radio parameters such as a subcarrier spacing and a symbol length). Accordingly, it is effective to design variable parameters in a scalable manner on the basis of LTE numerology. Based on this idea, Multi-Numerology of NR has been introduced. Specifically, the reference subcarrier spacing is the same as the LTE subcarrier spacing, and is set to 15 kHz. Other subcarrier spacings are defined by multiplying the reference subcarrier spacing by a power of 2. A plurality of subcarrier spacing configurations p are defined. Specifically, for $\mu=0$, the subcarrier spacing $\Delta f=15$ kHz and Cyclic prefix=Normal may be specified; for $\mu=1$, the subcarrier spacing $\Delta f=30$ kHz and Cyclic prefix=Normal may be specified; for $\mu=2$, the subcarrier spacing $\Delta f=60$ kHz and Cyclic prefix=Normal or Extended may be specified; for $\mu=3$, the subcarrier spacing $\Delta f=120$ kHz and Cyclic prefix=Normal may be specified; and for $\mu=4$, the subcarrier spacing $\Delta f=240$ kHz and Cyclic prefix=Normal may be specified.

The number of OFDM symbols included in one slot is set to 14 for any of the subcarrier spacing configurations $\mu=0$, 1, 2, 3, and 4. However, for the subcarrier spacing configurations $\mu=0$, 1, 2, 3, and 4, the number of slots included in one frame is set to 10, 20, 40, 80, and 160, and the number of slots included in one sub-frame is set to 1, 2, 4, 8, and 16. Here, since the frame length is 10 ms, for the subcarrier spacing configurations $\mu=0$, 1, 2, 3, and 4, the slot lengths are set to 1 ms, 0.5 ms, 0.25 ms, 0.125 ms, and 0.625 ms. Since the number of OFDM symbols included in one slot is set to 14 for any of the subcarrier spacing configurations $\mu=0$, 1, 2, 3, and 4, the OFDM symbol lengths differ for every subcarrier spacing configurations. For the subcarrier spacing configurations $\mu=0$, 1, 2, 3, and 4, the OFDM symbol lengths are set to $(1/14)$ ms, $(0.5/14)$ ms, $(0.25/14)$ ms, $(0.125/14)$ ms and $(0.0625/14)$ ms. As described above, by shortening the slot length and the OFDM symbol length, low-latency communication can be achieved. For example, the base station 20 can configure the subcarrier spacing for the terminal 10 by specifying any of $\mu=0$, 1, 2, 3, and 4 in a subcarrier spacing that is a parameter of an information element BWP.

(Extension of NR to Frequency Band Higher Than or Equal to 52.6 GHz)

Under the new radio (NR) Release 15 and the NR Release 16 of the third generation partnership project (3GPP), a frequency band up to the upper limit of 52.6 GHz is the target. With regard to extension of the NR to a frequency band higher than or equal to 52.6 GHz, in Release 16, a study item exists at a technical specification group radio access network (TSG RAN) level in which various regulations, use cases, requirements, and the like are examined. The study of the study item was completed in December 2019, and in Release 17, a study item and a work item for actually extending a technical specification to 52.6 GHz or higher have been agreed.

Figure 2:
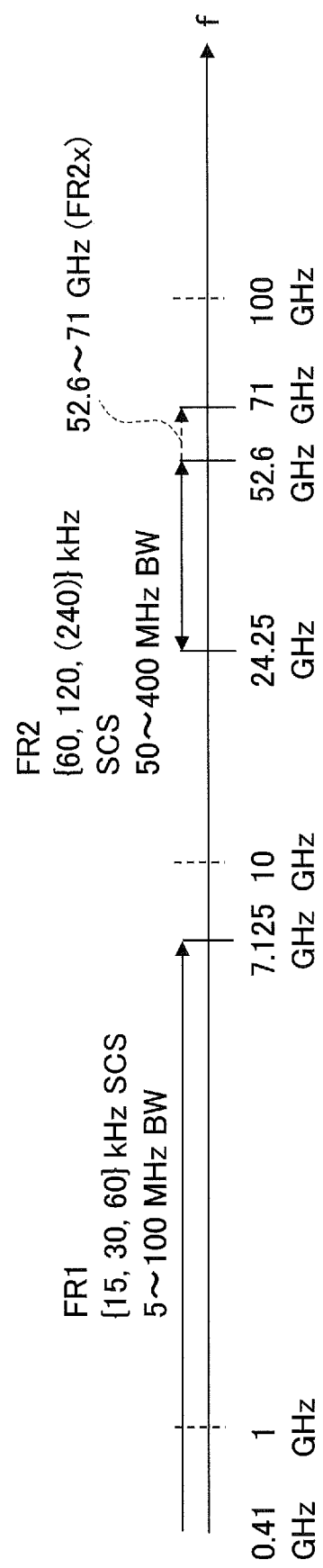
FIG. 2 is a diagram illustrating an example of extension of a frequency band of NR.

In the study items in Release 16, as an NR frequency band, extension from 52.6 GHz to 114.25 GHz was assumed, but in Release 17, time for the study is limited, and, thus, it is assumed that the frequency band to be studied is limited to a range from 52.6 GHz to 71 GHz as illustrated in FIG. 2. In addition, when extending the NR frequency band from 52.6 GHz to 71 GHz, it is assumed that extension is carried out on the basis of design of current NR frequency range 2 (FR2). The reason for this is because it is assumed that a considerable amount of time will be spent to conduct an examination on a new wave form.

In addition, the reason for limiting the frequency band to be studied to the range from 52.6 GHz to 71 GHz is as follows. For example, in a frequency band of 71 GHz or lower, a frequency band of 54 GHz to 71 GHz already exists as an unlicensed frequency band available for use in each country. In addition, at a word radio communication conference 2019 (WRC-2019), as a candidate for new frequency band for international mobile telecommunication (IMT), a frequency band from 66 GHz to 71 GHz is the highest frequency band. Thus, no frequency band higher than or equal to 71 GHz is available for use as a licensed band.

Current NR frequency bands include frequency range 1 (FR1), which corresponds to a frequency band of 410 MHz to 7.125 GHz, and FR2, which corresponds to a frequency band of 24.25 GHz to 52.6 GHz.

Note that, with regard to the frequency band of 52.6 GHz to 71 GHz, the definition of the current FR2 (frequency band of 24.25 GHz to 52.6 GHz) may be modified, and the frequency band may be included in a modified FR2, or may be defined as a new frequency range (FR) separately from the FR2.

(Objectives of Work Item)
(RAN1: Feature of Physical Layer)

One or a plurality of new numerologies for the terminal 10 and the base station 20 to operate in a frequency band of 52.6 GHz to 71 GHz. In a case where an influence on a physical signal/channel specified in a study item (SI), a countermeasure is taken for the influence.

Features related to the timeline suitable for each new numerology. For example, preparing time and calculation time for each of bandwidth part (BWP) and beam switching time, hybrid automatic repeat request (HARQ) scheduling, user equipment (UE) processing, physical downlink shared channel (PDSCH), physical uplink shared channel (PUSCH)/sounding reference signal (SRS), and channel state information (CSI).

Up to 64 synchronization signal block (SSB) beams for an operation in a licensed frequency band and an operation in an unlicensed frequency band in a frequency band of 52.6 GHz to 71 GHz.

Physical layer processing may include a channel access mechanism that expects beam-based operation to meet regulatory requirements applicable to the unlicensed frequency band from 52.6 GHz to 71 GHz.

(Harq-Ack Codebook)

In the following embodiments, examples of HARQ-ACK transmission from the terminal 10 to the base station 20 using a HARQ-ACK codebook are described.

A HARQ-ACK codebook specifies a transmission method including a method for setting the number of bits to be transmitted when one or more HARQ-ACKs are to be transmitted. A HARQ-ACK codebook may be formed by including HARQ-ACK bits in a unit of at least one of a time domain unit (for example, a slot), a frequency domain unit (for example, Component Carrier (CC)), a spatial domain unit (for example, a layer), a unit of a transport block (TB), or a unit of a code block group forming a TB (Code Block Group (CBG)). The CC may also be referred to as a cell, a serving cell, a carrier, or the like. The bits may also be referred to as HARQ-ACK bits, HARQ-ACK information, HARQ-ACK information bits, or the like. The HARQ-ACK codebook is also called a PDSCH-HARQ-ACK codebook (pdsch-HARQ-ACK-Codebook), a codebook, a HARQ codebook, a HARQ-ACK size, or the like.

The number of bits (size) or the like to be included in the HARQ-ACK codebook may be semi-statically or dynamically determined. A semi-static HARQ-ACK codebook is also called a Type I HARQ-ACK codebook, a semi-static codebook, or the like. A dynamic HARQ-ACK codebook is also called a Type II HARQ-ACK codebook, a dynamic codebook, or the like.

A higher layer parameter (e.g., pdsch-HARQ-ACK-Codebook) may be used to configure whether the Type I HARQ-ACK codebook is to be used or the Type II HARQ-ACK codebook is to be used for the terminal 10.

In the case of the Type I HARQ-ACK codebook, the terminal 10 may generate a HARQ-ACK codebook of a predetermined size and may feed back the HARQ-ACK bits corresponding to HARQ processes by using bits in the codebook, regardless of presence or absence of scheduling of a PDSCH corresponding to a HARQ process number in each CC.

The predetermined size may be determined based on at least one of (i) a predetermined time interval (e.g., a set of a predetermined number of candidate occasions for a PDSCH reception, or a predetermined number of monitoring occasions, m, for a PDCCH), (ii) the number of CCs to be configured for or activated in the terminal 10, (iii) the maximum number of HARQ processes per CC, (iv) the number of TBs (the number of layers or ranks), (v) the number of CBGs per one TB, or (vi) presence or absence of spatial bundling. The predetermined range is also referred to as a HARQ-ACK bundling window, a HARQ-ACK feedback window, a bundling window, a feedback window, or the like.

In the type-I HARQ-ACK codebook, the terminal 10 feeds back NACK bits even if there is no PDSCH scheduling for the terminal 10. Accordingly, in a case where the Type I HARQ-ACK codebook is used, it is expected that a number of HARQ-ACK bits to be fed back will exceed the number of scheduled PDSCHs that should be reported.

In contrast, in a case of the Type II HARQ-ACK codebook, the terminal 10 may dynamically determine the HARQ-ACK codebook size and may feed back only the HARQ-ACK bits for the scheduled PDSCHs.

Specifically, the terminal 10 may determine the number of bits in the Type II HARQ-ACK codebook based on a predetermined field (for example, the Downlink Assignment Indicator (Index) (DAI) field) in the DCI. The DAI field may be split into a counter DAI (cDAI) and a total DAI (tDAI).

The counter DAI may indicate a counter value of downlink transmissions (PDSCHs, Data, TBs) scheduled within a predetermined period. For example, the counter DAI in the DCI for scheduling data within the predetermined period may indicate the number counted first in the frequency domain (e.g., CCs) and subsequently in the time domain within the predetermined period.

The total DAI may indicate the total number of data scheduled within a predetermined period. For example, the total DAI in the DCI for scheduling data in a predetermined time unit (e.g., a PDCCH monitoring occasion) within the predetermined period may indicate the total number of data scheduled up to the predetermined time unit (which is also referred to as point, timing, or the like) within the predetermined period.

The terminal 10 may transmit one or more HARQ-ACK bits determined (generated) based on the Type I or Type II HARQ-ACK codebook using at least one of a Physical Uplink Control Channel (PUCCH) or a Physical Uplink Shared Channel (PUCCH).

(Problem 1)

In the 3 GPP Release 15/Release 16 technical specifications, a slot offset has been introduced for performing scheduling and/or feedback (e.g., $K_0$, and $K_2$).

Figure 3:
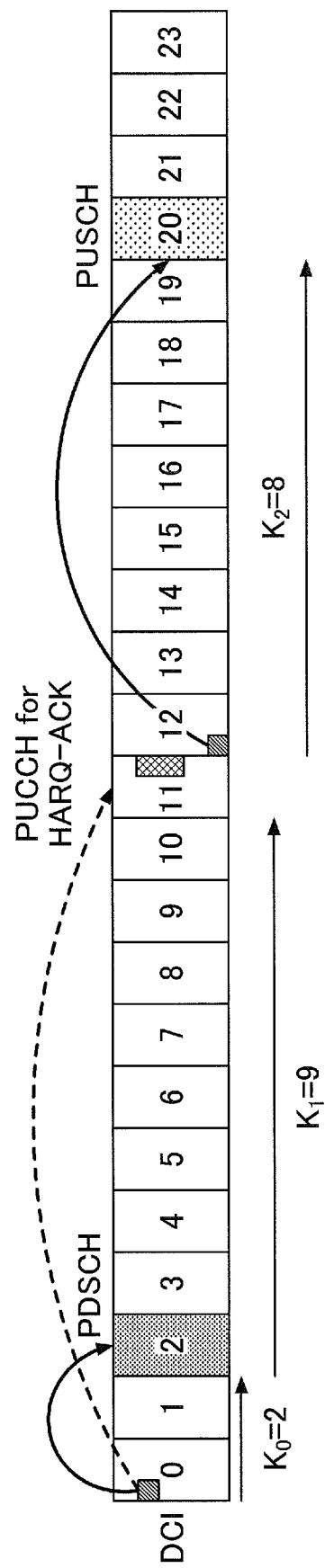
FIG. 3 is a diagram illustrating examples of $K_0$, $K_1$, and $K_2$.

Here, $K_0$ may be an offset in units of slots from a slot position where the DCI is to be transmitted to a slot position where the PDSCH is to be transmitted in a cell to be scheduled. In the example of FIG. 3, a slot including a PDSCH to be scheduled by the DCI is configured in the second slot from the slot in which the DCI is transmitted. The value of $K_0$ ranges from 0 to 32. Note that $K_0$ may be a value based on the numerology of PDSCH.

$K_1$ may be an offset in units of slots from a position of the slot where a PDSCH is to be transmitted to a position of a PUCCH slot where a corresponding feedback is to be transmitted in the scheduling cell. Note that the feedback may be HARQ-ACK, HARQ information, HARQ response, or delivery confirmation information such as that of indicating a likelihood of presence or absence of a delivery (a value in a range from 0 to 1).

In the example of FIG. 3, $K_1=9$ means that after a PDSCH is received in slot 2, feedback corresponding to the PDSCH is to be returned in the ninth slot from the slot in which the PDSCH is received, i.e., the eleventh slot. A value that can be set as $K_1$ is from 0 to 15. Furthermore, as a value that can be set to $K_1$, non-numeric value is specified in Release 16.

$K_2$ may be an offset in units of slots from a position of a slot in which the DCI is to be transmitted to a slot in which a PUSCH is to be transmitted, in a scheduled cell. In the example of FIG. 3, $K_2=8$. The value of $K_2$ is in a range from 0 to 32.

In the frequency band from 52.6 GHz to 71 GHz, a larger subcarrier spacing (SCS) (e.g., 240 kHz and 480 kHz) is used. In this case, a slot size (time interval) is expected to be very small. In other words, the number of slots included in a time period is very large. For example, if the subcarrier spacing is 480 kHz, the number of slots included in one subframe is expected to be one of 32, 64, or 128.

For an unlicensed frequency, a channel occupancy (CO) may be started from DL, and corresponding feedback may be assigned to the end of the CO (or the last time resource that is included in the CO (e.g., the last symbol)). Switching DL/UL in CO requires a time gap (overhead) for listening before talk (LBT), and performing the LBT during this gap period may cause interference between nodes that have successfully performed the LBT at the same time. Accordingly, it is not appropriate to include many DL/UL switches in the middle of the CO. Thus, if the SCS is large, a larger value is to be required for the slot offset.

(Problem 2)

A HARQ process number is used in HARQ processing. A HARQ process number is a process number for parallel processing of HARQ processes. If the HARQ process number is 1, the transmitting side transmits data on a Physical Downlink Shared Channel (PDSCH), and the receiving side receives the data, determines an error in the data reception, and performs feedback of the reception result to the transmitting side. In this case, when the content of the feedback is ACK (positive acknowledgement), the next data is to be transmitted. In this case, since the next data cannot be transmitted until the data is successfully received, latency in a radio section may increase. In order to avoid such latency, a HARQ process number that is greater than one may be used for processing the HARQ processes in parallel.

Figure 4:
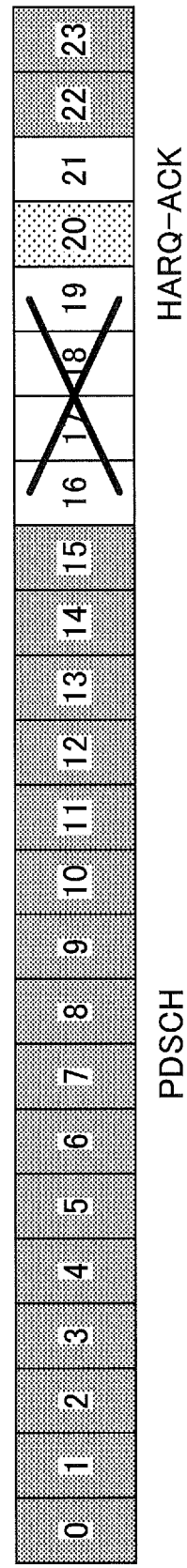
FIG. 4 is a diagram illustrating a situation in which feedback is provided after 16 HARQ processes.

A maximum of 16 HARQ processes can be configured for 1 component carrier (CC). The HARQ process number (HPN) is specified by the value of the 4-bit field included in the DCI, and the DCI indicates the HARQ process number. If the base station 20 assigns 16 HARQ processes to the terminal 10, the base station 20 is to cause the terminal 10 to perform feedback after 16 PDSCH transmissions in order to transmit the next PDSCH. FIG. 4 illustrates a situation in which feedback is performed after 16 HARQ processes. After the transmission of the PDSCHs in the 16 slots as illustrated in FIG. 4, feedback from the terminal is to be received, and a PDSCH transmission is not expected to occur during the period in which the feedback is to be received.

In the frequency band from 52.6 GHz to 71 GHz, a larger subcarrier spacing (SCS) (e.g., 240 kHz and 480 kHz) is used. In this case, the slot size (time interval) is expected to be very small. In other words, the number of slots included in a time period is very large. For example, if the subcarrier spacing is 480 kHz, the number of slots included in one subframe is expected to be one of 32, 64, or 128.

For an unlicensed frequency, channel occupancy (CO) may start at DL, and corresponding feedback may be assigned to the end of the CO (or the last time resource that included in the CO (e.g., the last symbol)). Switching DL/UL in CO requires a time gap (overhead) for listening before talk (LBT), and performing the LBT during this gap period may cause interference between nodes that have successfully performed the LBT at the same time. Accordingly, it is not appropriate to include many DL/UL switches in the middle of the CO. Thus, a larger number of HARQ processes is expected to be required as the SCS increases.

(Problem 3)

DCI includes a Downlink Assignment Index (DAI) field. The DAI includes a counter DAI and a total DAI.

Figure 5:
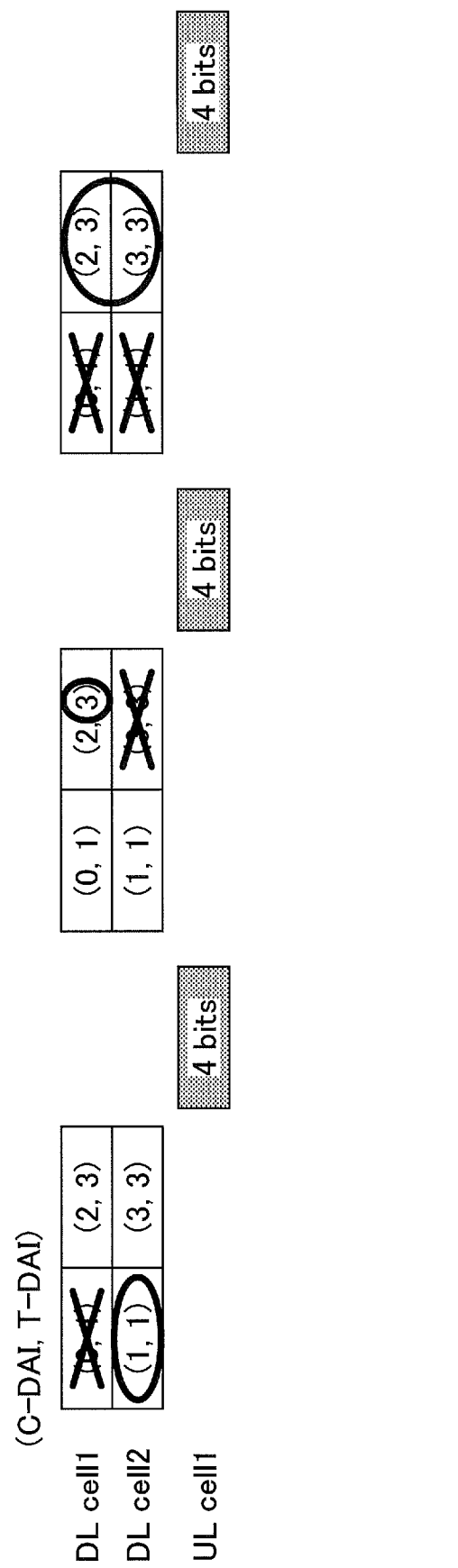
FIG. 5 is a diagram illustrating an example of transmitting DAI by including the DAI in DCI.

The counter DAI (2 bits if included in the DCI) is information for counting scheduled CCs. For Type II HARQ-ACK codebook, the terminal 10 generates the number of HARQ-ACK bits corresponding to the number of PDSCHs that are expected to have actually been transmitted from base station 20. The terminal 10 may be unable to receive the PDCCH signal from the base station 20, and, thus, the base station 20 may transmit, to the terminal 10, a notification of a number of PDSCHs to be transmitted to the terminal 10 by including the DAI in the DCI. FIG. 5 is a diagram illustrating an example of transmitting a notification of the DCI including the DAI. As illustrated in FIG. 5, the numbers on the left side in parentheses, such as (0, 1), (1, 1), (2, 3) and (3, 3), correspond to the counter DAI. For example, as illustrated at the left end of FIG. 5, even if the terminal 10 cannot detect the DCI indicated by (0, 1) from among the DCIs indicated by (0, 1), (1, 1), (2, 3), and (3, 3), the terminal 10 determines that there should be (0, 1) before (1, 1) because the terminal 10 has detected the DCI indicated by (1, 1). The terminal 10 can set the HARQ-ACK bit corresponding to the PDSCH scheduled in the PDCCH including (0, 1) to NACK and transmit the HARQ-ACK bit. As described above, in the case of the Type II HARQ-ACK codebook, the number of HARQ-ACK bits to be transmitted by the terminal 10 can be made equal to the number of HARQ-ACK bits determined by the base station 20.

The total DAI (for example, 2 bits may be included in the DCI) is a counter that counts the total number of PDCCHs transmitted for scheduling CCs at each timing. In the example of FIG. 5, since the scheduling for the two downlink cells is performed at one timing, the total number is counted up by two at each timing. As illustrated in FIG. 5, the numbers on the right side in parentheses, such as (0, 1), (1, 1), (2, 3), and (3, 3), correspond to the total DAI. Since the total number is incremented by two at each time, the total DAI takes the values of 1 and 3. For example, even if the DCI indicated by (3, 3) from among (0, 1), (1, 1), (2, 3), and (3, 3) cannot be detected in the middle portion of FIG. 5, the terminal 10 has detected the DCI indicated by (2, 3), so that, even if it is unknown whether the DCI of (3, 3) has been transmitted in the counter DAI, it can be determined from the total DAI value 3 of (2, 3) that there should be a DCI of (3, 3), and the HARQ-ACK bit corresponding to the PDSCH scheduled by the PDCCH including (3, 3) can be set to NACK and the HARQ-ACK bit can be transmitted.

Since the size of the DAI is 2 bits for the counter DAI and 2 bits for the total DAI, due to the limitation of the bit size, when four or more consecutive detection errors of the DCI occur, the error determination by using the DAI cannot be performed.

In a higher unlicensed frequency band, path blocking and/or collisions with a coexisting system can cause such continuous detection errors. Accordingly, the current size of the DAI is considered to be insufficient for the unlicensed frequency band, and it is expected that the size of the DAI is to be enlarged. However, increasing the size of the DCI may also reduce the performance of the PDCCH. Furthermore, even if the size of the DAI is increased, if it is not possible to detect a plurality of DCIs having the same timing at the end (that is, the last timing of transmitting the PDCCHs for scheduling the PDSCH corresponding to the HARQ-ACK bit included in the feedback) in terms of time, the terminal 10 may not be able to detect the total number of received DCIs, and there may be a mismatch between the total number of DCIs expected between the base station 20 and the terminal 10.

In the Release 16 NR, the Enhanced dynamic codebook has been introduced. This is a mechanism introduced for NR-U. DCI format 1_1 indicates HARQ feedback for one scheduled PDSCH group or two scheduled PDSCH groups. For example, if the number of groups is two, the two groups may be group 0 for HARQ feedback in COT #0 and group 1 for HARQ feedback in COT #1. In this manner, when a PDSCH is to be scheduled, an index indicating a group number can be attached to the PDSCH in advance. The number of groups may be two, and, in this case, the index is 0 or 1.

Figure 6:
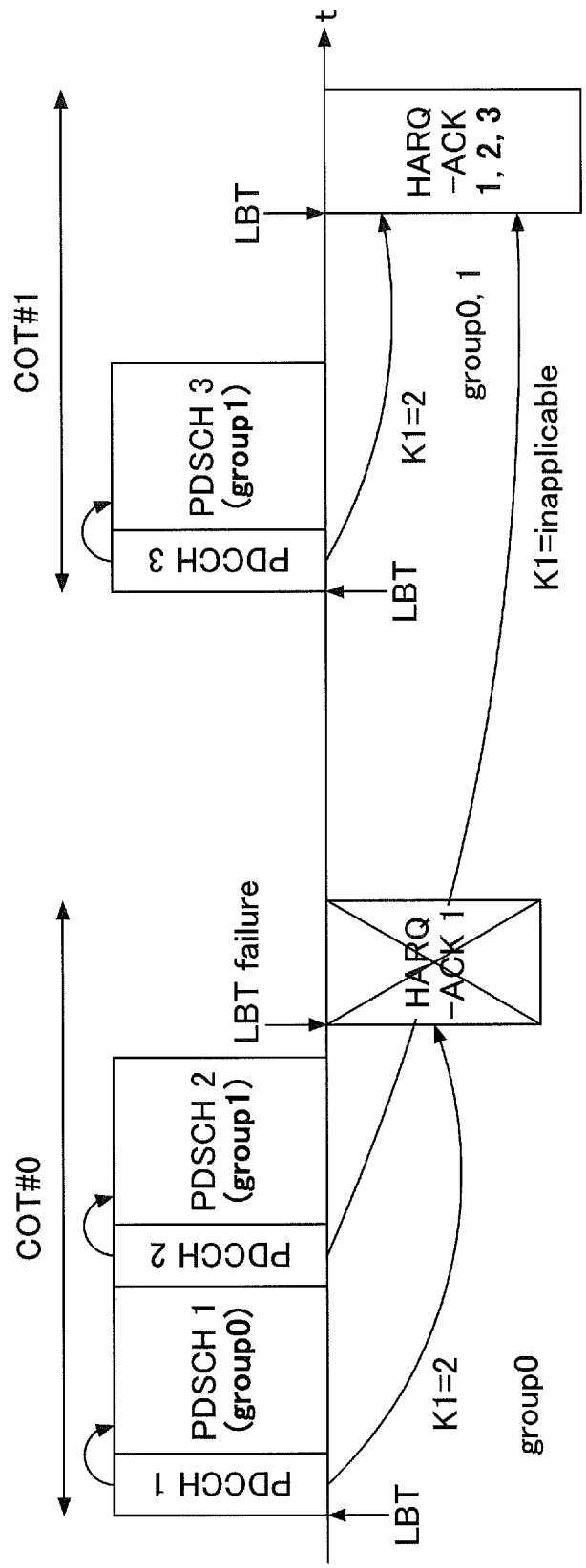
FIG. 6 is a diagram illustrating an example of using an Enhanced dynamic codebook.

FIG. 6 is a diagram illustrating an example of using an Enhanced dynamic codebook. As illustrated in FIG. 6, for example, suppose that feedback (HARQ ACK1) for group 0 has been scheduled, but there is a failure in LBT, so that feedback (HARQ ACK1) for group 0 cannot be transmitted. In such a case, the feedback for the PDSCH group 0 can be performed again at another timing.

In this case, the value of the counter DAI and the value of the total DAI are counted on a per group basis. Accordingly, even if all the PDCCH detections for group 0 fail, there is no effect on the HARQ-ACK feedback for group 1 (in other words, if the PDCCH for group 1 is correctly detected, the HARQ-ACK codebook size for group 1 can be correctly derived).

Currently, the maximum number of PDSCH groups is two. If it is possible to set the number of PDSCH groups to be a greater number, the impact due to erroneous detection of consecutive PDCCHs can be reduced.

(Proposal 1)

At least one of the following extensions may be introduced in the NR unlicensed band higher than 52.6 GHz (e.g., 59 GHz-64 GHz, 57 GHz-66 GHz, 57 GHz-64 GHz, and 57 GHz-71 GHz).

The maximum value that can be set to $K_0$ is to be greater than 32.

The maximum value that can be set to $K_2$ is to be greater than 32.

The maximum value that can be set to $K_1$ (the name of the RRC parameter is dl-DataToUL-ACK) is to be greater than 16. Note that the DCI field used for actually indicating the value of $K_1$ by using the DCI is the PDSCH-to-HARQ feedback timing indicator field. Specifically, the PDSCH-to-HARQ feedback timing indicator field indicates, by using three bits, the value to be used from among eight candidate values determined as dl-DataToUL-ACK. The size of the PDSCH-to-HARQ feedback timing indicator field may be greater than 3 bits, and the number of candidate values that can be specified by dl-DataToUL-ACK may be greater than 8.

The maximum number of HARQ processes may be greater than 16. The size of the HARQ process number field of the DCI may be greater than 4 bits.

The non-numerical value (inapplicable value) of $K_1$ (dl-DataToUL-ACK) may be applicable not only when the enhanced dynamic HARQ codebook (pdsch-HARQ-ACK-Codebook=enhancedDynamic-r 16) is configured but also when the enhanced dynamic HARQ codebook is not configured.

If the DCI for scheduling the PDSCH indicates a non-numeric value (inapplicable value) in the PDSCH-to-HARQ feedback timing indicator field, the HARQ-ACK feedback timing for the PDSCH may be determined by a subsequent DCI received by the terminal 10 after the DCI and that indicates a value other than the non-numeric value (inapplicable value) in the PDSCH-to-HARQ feedback timing indicator field.

The terminal 10 that supports the above-described extensions may transmit, to the base station 20, the UE capability indicating that the terminal 10 supports the extensions.

Alt. 1: Support for the above-described extensions may be mandatory for the terminal 10 operating from 52.6 GHz to 71 GHz, and the above-described extensions may not be applicable for the terminal 10 not operating from 52.6 GHz to 71 GHz. In this case, even if the terminal 10 does not transmit a notification of the UE capability to the base station 20, the base station 20 may interpret that the terminal 10 supports the above-described extensions when the terminal 10 operates from 52.6 GHz to 71 GHz. If the terminal 10 does not operate from 52.6 GHz to 71 GHz, the base station 20 may interpret that the terminal 10 does not support the above-described extensions.

Alt. 2: The above-described extensions may be optional for the terminal 10 operating from 52.6 GHz to 71 GHz, and the above-described extensions may not be applicable for the terminal 10 not operating from 52.6 GHz to 71 GHz. The terminal 10 operating from 52.6 GHz to 71 GHz may transmit, to the base station 20, whether the above-described extensions are supported, as the UE capability.

Alt. 3:1:Support for the above-described extensions may be mandatory for the terminal 10 operating from 52.6 GHz to 71 GHz, and the above-described extensions may be optional for the terminal 10 not operating from 52.6 GHz to 71 GHz.

Alt. 4: Support for the above-described extension may be optional for the terminal 10.

For different extensions, different Alts from among the above-described Alt. 1 to Alt. 4 may be applied.

A new default time domain resource assignment configuration may be defined and applied to the NR unlicensed band higher than 52.6 GHz (for example, 59 GHz-64 GHz, 57 GHz-66 GHz, 57 GHz-64 GHz, and 57 GHz-71 GHz).

For example, default time domain resource assignments A and C for a PDSCH may be defined and applied. In a new table, a non-zero value of $K_0$ may be introduced.

For example, a default time domain resource assignment B for a PDSCH may be defined and applied. In a new table, a non-zero value of $K_0$ may be introduced.

For example, a default time domain resource assignment A for a PUSCH may be defined and applied. For Release 15, the value of K 2 is {j, j+1, j+2, j+3}, and j={1, 1, 2, 3} for 15/30/60/120 kHz SCSs. In a new table, the value of j may be greater than or equal to 3 for SCS greater than 120 kHz, and/or the value of $K_2$ may be greater than j+3 (which may be j+4, for example).

For example, a new default candidate value for the PDSCH-to-HARQ feedback timing indicator may be defined. In Release 15, the candidate values for the PDSCH-to-HARQ feedback timing indicator in DCI format 1_0 are {1, 2, 3, 4, 5, 6, 7, 8}. The new default candidate values may include a number greater than 8.

It is described that the DCI is received and the HARQ information is transmitted for the PDSCH reception. In this regard, the DCI may be control information specified in a future standard, the PDSCH may be a CC or a TB, and the HARQ information may be alternative feedback information. In this case, $K_0$, $K_1$, and $K_2$ may also be an offset for determining a time resource (e.g., a slot or a symbol) from the reception of control information to the reception of downstream information (e.g., a CC or a TB), an offset for determining a time resource (e.g., a slot or a symbol) from the reception to the transmission of feedback, and an offset for determining a time resource (e.g., a slot or a symbol) from the transmission of feedback information to the transmission of the next uplink information (e.g., a CC or a TB), respectively.
(Proposal 2)

At least one extension from among the following extensions or constraints may be introduced in the NR unlicensed band in a frequency band higher than 52.6 GHz (for example, 59 GHz-64 GHz, 57 GHz-66 GHz, 57 GHz-64 GHz, and 57 GHz-71 GHz).

The size of the counter DAI may be greater than 2 bits.

The size of the total DAI may be greater than 2 bits. If NFI-TotalDAI-Included-r 16=enable and more than 1 CC is configured for DL, the size of the T-DAI may be greater than 4 bits.

A minimum channel bandwidth (BW) greater than 400 MHz may be specified. By limiting the minimum channel bandwidth to a wide minimum channel bandwidth (BW) (e.g., wider than or equal to 400 MHz), the maximum number of CCs in 52.6 GHz-71 GHz becomes not so large.

The Type 2 HARQ-ACK codebooks need not be supported/applied.

A new HARQ-ACK codebook function (#1) may be introduced.

The Total DAI field (or a portion thereof) may be used to indicate the size of the HARQ-ACK codebook. The terminal 10 may expect that the sizes of the HARQ-ACK codebook for the same feedback transmitted in different DCIs are the same. The base station 20 may, for example, set candidate values for the size of the HARQ-ACK codebook by using RRC signaling, and one of the candidate values may be selected by using DCI. The size of the counter DAI may be extended so that a counter value can be indicated without modulo operation.

FIG. 7 illustrates an example in which DAI is transmitted by including the DAI in DCI. In the example of FIG. 7, the size of the counter DAI is 2 bits, and the size of the total DAI is 2 bits. As illustrated in FIG. 7, the numbers on the left side in parentheses, such as (0, 1), (1, 1), (2, 3) and (3, 3), correspond to the counter DAI. Furthermore, the numbers on the right side in parentheses, such as (0, 1), (1, 1), (2, 3), and (3, 3), correspond to the total DAI. In the example illustrated at the left end of FIG. 7, the size of the HARQ-ACK codebook is 4 bits. In contrast, in the example illustrated on the right side of FIG. 7, the size of the HARQ-ACK codebook is 8 bits. In the example illustrated on the right side of FIG. 7, the counter DAI takes values of 0, 1, 2, and 3, and then repeats values of 0, 1, 2, and 3. This is because the modulo operation (mod 4) is applied. In the example illustrated on the right side of FIG. 7, if there is a failure in detection the DCI corresponding to the values 0, 1, 2, and 3 of the counter DAI positioned forward in time, the terminal 10 may erroneously determine that the size of the HARQ-ACK codebook is 4 bits, because the values of the counter DAI 0, 1, 2, and 3 are repeated at the subsequent timing.

Figure 8:
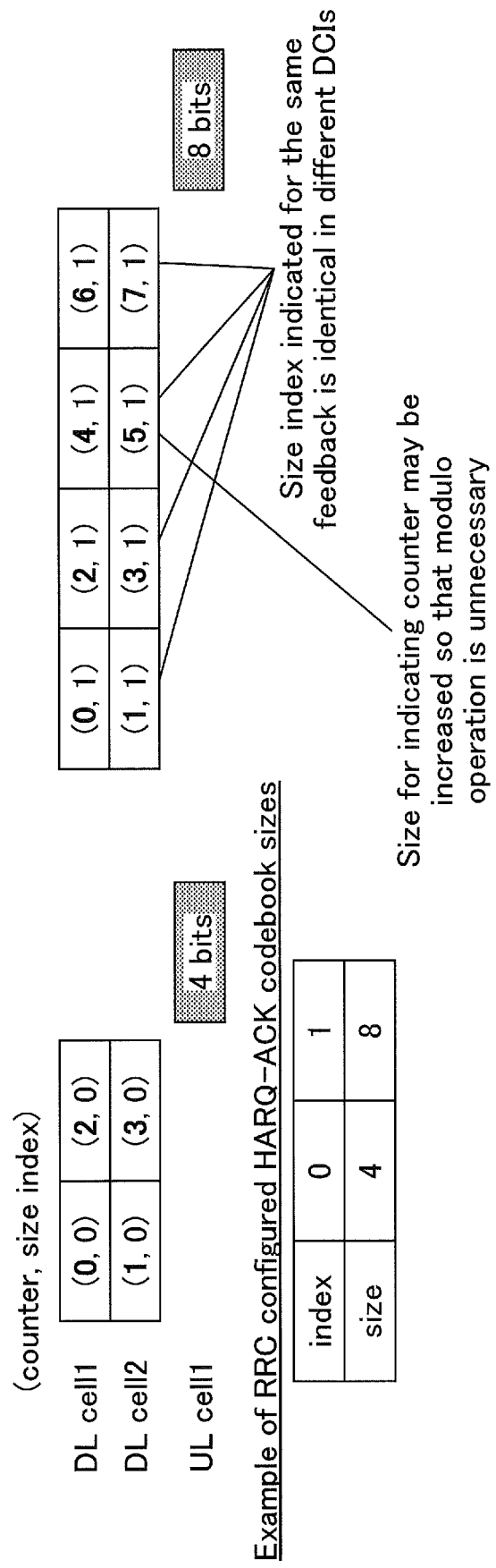
FIG. 8 is a diagram illustrating an example of New HARQ-ACK codebook #1.

FIG. 8 illustrates an example of the New HARQ-ACK codebook #1. As illustrated in FIG. 8, the size of the counter DAI is extended to 3 bits, and no modulo operation is applied. The total DAI indicates the size of the HARQ-ACK codebook. By using RRC, it may be preconfigured that, when the value of the total DAI is 0, the size of the HARQ-ACK codebook is 4 bits, and when the value of the total DAI is 1, the size of the HARQ-ACK codebook is 8 bits. By configuring the counter DAI and the total DAI in this way, it is possible to avoid mismatches in the recognized size of the HARQ-ACK code book between the terminal 10 and the base station 20. Furthermore, based on the missing value of the counter DAI, the corresponding HARQ-ACK bit can be set to NACK and transmitted.

For the enhanced dynamic HARQ codebook (pdsch-HARQ-ACK-Codebook=enhancedDynamic-r16), the maximum number of PDSCH groups may be greater than 2.

A new HARQ-AKC codebook (#2) may also be introduced. In the new HARQ-AKC codebook mechanism (#2), the value of the DAI may be generated based on the DCI per predetermined time interval. For example, the values of the DAI may be generated based on the DCI per PDCCH monitoring period. For example, the values of the DAI may be generated based on the DCI per period configured by using RRC (e.g., per predetermined number of slots, or per predetermined number of monitoring occasions).

The terminal 10 may report, to the base station 20, whether the terminal 10 has detected a scheduling DCI, on a per PDCCH monitoring occasion basis. Information indicating whether terminal 10 has detected the DCI on a per PDCCH monitoring occasion basis may be encoded separately from the HARQ-ACK for the data and multiplexed in the UCI.

The HARQ-ACK codebook size may be determined based on 1) the number of PDCCH monitoring occasions at which DCIs have been detected, and 2) the value of the DAI indicated in each DCI.

FIG. 9 illustrates an example in which DAI is transmitted by including the DAI in DCI. In the example of FIG. 9, the size of the counter DAI is 2 bits, and the size of the total DAI is 2 bits. As illustrated in FIG. 9, the numbers on the left side in parentheses, such as (0, 3), (1, 3), (2, 3) and (3, 3), correspond to the counter DAI. Furthermore, the numbers on the right side in parentheses, such as (0, 3), (1, 3), (2, 3), and (3, 3), correspond to the total DAI.

Since there are four DL cells in the left side of FIG. 9, the counter DAI repeats the values 0, 1, 2, 3, 0, 1, 2, 3. The total DAI takes a value of 3 up to the second slot from the left because there are four DL cells. In the third slot from the left, since the DCI from DL cell 4 is not transmitted, the total DAI takes a value of 2. In the left side of FIG. 9, based on the missing value of the counter DAI, the corresponding HARQ-ACK bit can be set to NACK and transmitted.

In the right end of FIG. 9, detection of the DCI of DL cell 1 to DL cell 4 has failed in the second slot from the left. Accordingly, the terminal 10 may erroneously recognize that the size of the HARQ-ACK codebook is 7 bits. In this regard, because the base station 20 assumes that the size of the HARQ-ACK codebook is 11 bits, it is possible that the size of the HARQ-ACK codebook recognized by the base station 20 does not match the size of the HARQ-ACK codebook recognized by the terminal 10.

Figure 10:
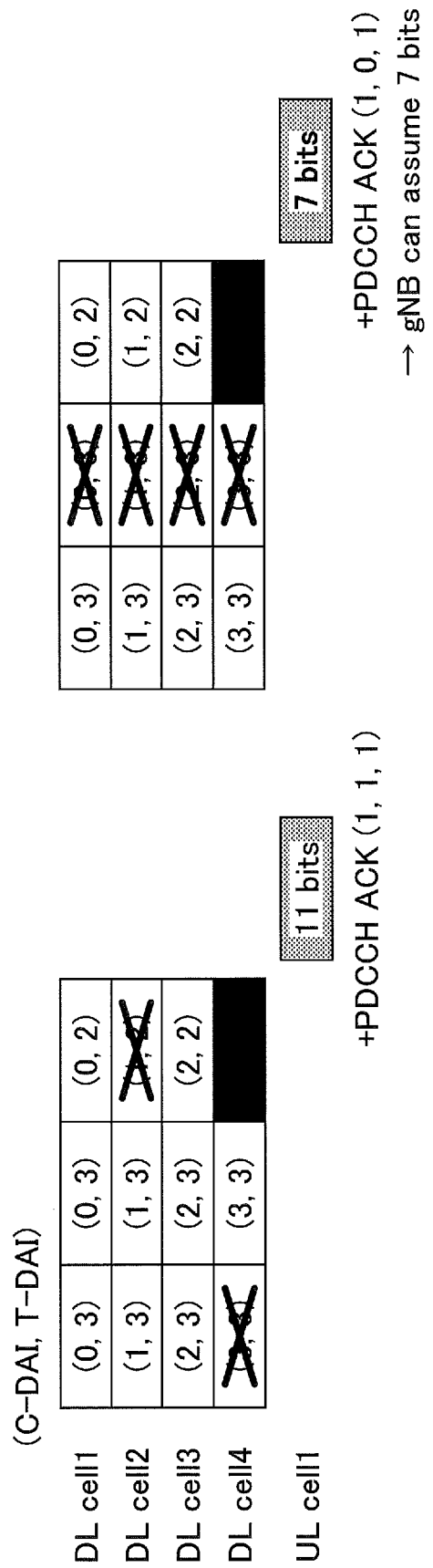
FIG. 10 is a diagram illustrating an example of the new HARQ-AKC codebook (#2).

FIG. 10 is a diagram illustrating an example of the new HARQ-AKC codebook (#2). In the example of FIG. 10, the size of the counter DAI is 2 bits, and the size of the total DAI is 2 bits. As illustrated in FIG. 10, the numbers on the left side in parentheses, such as (0, 3), (1, 3), (2, 3) and (3, 3), correspond to the counter DAI. Furthermore, the numbers on the right side in parentheses, such as (0, 3), (1, 3), (2, 3), and (3, 3), correspond to the total DAI. In the example of FIG. 10, when the feedback is returned, the terminal 10 transmits a bitmap indicating whether the PDCCHs have been received.

In the example illustrated on the left side of FIG. 10, since the terminal 10 has been able to receive at least one DCI in the first slot, the second slot, and the third slot from the left, a bitmap (1, 1, 1) is returned, as a bitmap indicating whether the PDCCHs have been received.

In the example illustrated on the right side of FIG. 10, since the terminal 10 has failed to detect the DCI in the second slot from the left, the terminal 10 returns a bitmap (1, 0, 1), as a bitmap indicating whether the PDCCHs have been received.

In the example illustrated on the right side of FIG. 10, the terminal 10 recognizes the size of the HARQ-ACK codebook as 7 bits. Based on the bitmap (1, 0, 1) indicating whether the PDCCKs have been received, the base station 20 can recognize that the terminal 10 has transmitted a 7 bit HARQ-ACK codebook, except for the DCI that could not be detected in the second slot from the left in the example illustrated on the right side in FIG. 10. As a result, mismatches in recognizing the size of the HARQ-ACK codebook between the base station 20 and the terminal 10 can be avoided.

(Device Configuration)

Next, a functional configuration example of the terminal 10 and the base station 20 which execute the above-described processing operations is described. The terminal 10 and the base station 20 are provided with all functions described in the embodiments. However, the terminal 10 and the base station 20 may be provided with partial functions among the all functions described in the embodiments. Note that, the terminal 10 and the base station 20 may be collectively referred to as a communication device.

<Terminal 10>

Figure 11:
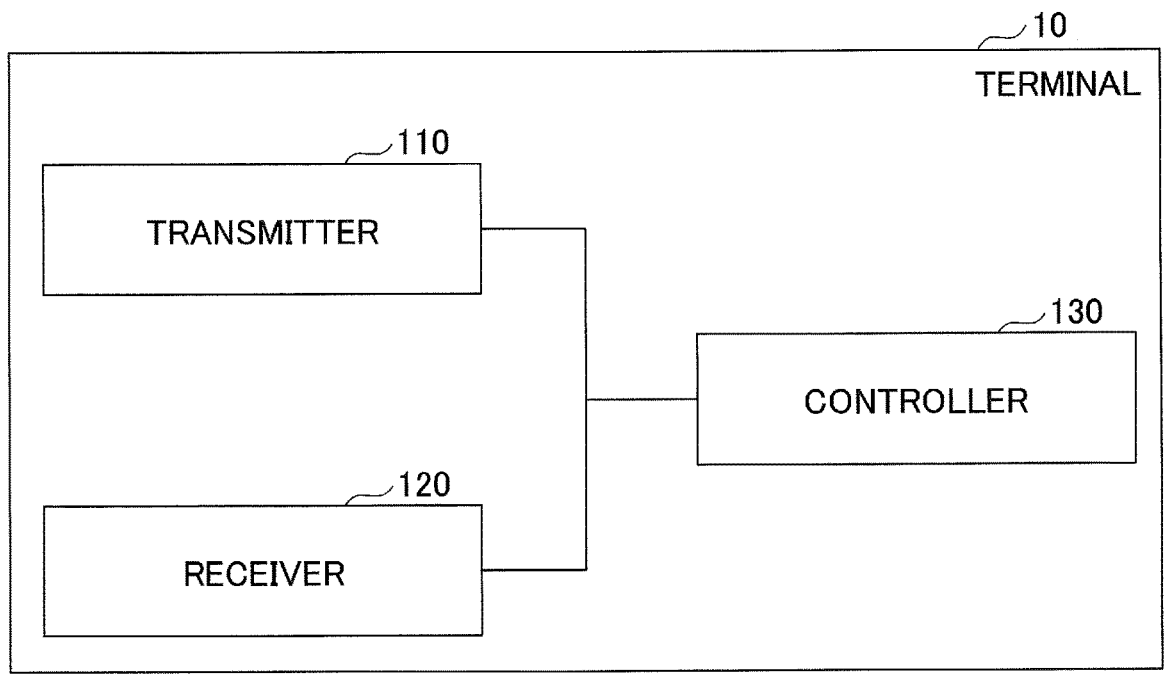
FIG. 11 is a diagram illustrating an example of a functional configuration of terminal 10.

FIG. 11 is a diagram illustrating an example of a functional configuration of the terminal 10. As illustrated in FIG. 11, the terminal 10 includes a transmitter 110, a receiver 120, and a controller 130. The functional configuration illustrated in FIG. 11 is illustrative only. A functional division and the names of the functional units may be any division and name as long as the operation according to the embodiments can be executed. Note that, the transmitter 110 may be referred to as a transmitter, and the receiver 120 may be referred to as a receiver.

The transmitter 110 creates transmission from transmission data, and wirelessly transmits the transmission signal. The transmitter 110 may form one or a plurality of beams. The receiver 120 wirelessly receives various signals, and acquires a signal of a higher layer from a received physical layer signal. In addition, the receiver 120 includes a measurement unit that performs measurement of a signal that is received to obtain received power or the like.

The controller 130 performs control of the terminal 10. Note that, a function of the controller 130 which relates to transmission may be included in the transmitter 110, and a function of the controller 130 which relates to reception may be included in the receiver 120.

For example, in the frequency band from 52.6 GHz to 71 GHz, the controller 130 of the terminal 10 may set the number of slots larger than 32 slots, as the value of the offset from the slot including the PDCCH to the slot including the PDSCH scheduled by the PDCCH when performing the operation of the Hybrid Automatic Repeat Request (HARQ). The controller 130 of the terminal 10 may set the number of slots larger than 15 slots, as the offset value from the slot in which the PDSCH is received to the slot in which the feedback corresponding to the PDSCH is returned. The controller 130 of the terminal 10 may set the number of slots larger than 32 slots, as the offset value from the slot including the PDCCH to the slot including the PUSCH when performing uplink scheduling. The controller 130 of the terminal 10 may set a value greater than 16, as the HARQ process number per CC.

For example, in the frequency band from 52.6 GHz to 71 GHz, the receiver 120 of the terminal 10 may receive the configuration information transmitted from the base station 20, and the controller 130 of the terminal 10 may change the interpretation of the counter DAI and the total DAI in the Downlink Assignment Indicator (DAI) included in the control information transmitted from the base station 20. The controller 130 of the terminal 10 may interpret the total DAI as specifying the size of the codebook for transmitting feedback information. Furthermore, the controller 130 of the terminal 10 may interpret that the counter DAI counts the number of times DCI is received. For example, in the frequency band from 52.6 GHz to 71 GHz, the controller 130 of the terminal 10 may report to the base station 20 whether the receiver 120 of the terminal 10 has detected DCI on a per PDCCH monitoring occasion basis. The transmitter 110 of the terminal 10 may encode information indicating whether the receiver 120 of the terminal 10 has detected the DCI on the per PDCCH monitoring occasion basis, separately from the HARQ-ACK for the data, and multiplex the information in the UCI for transmission. The controller 130 of the terminal 10 may create a bitmap indicating whether the PDCCH has been received in each slot, and the transmitter 110 of the terminal 10 may transmit the bitmap together with the HARQ-ACK codebook.

<Base Station 20>

Figure 12:
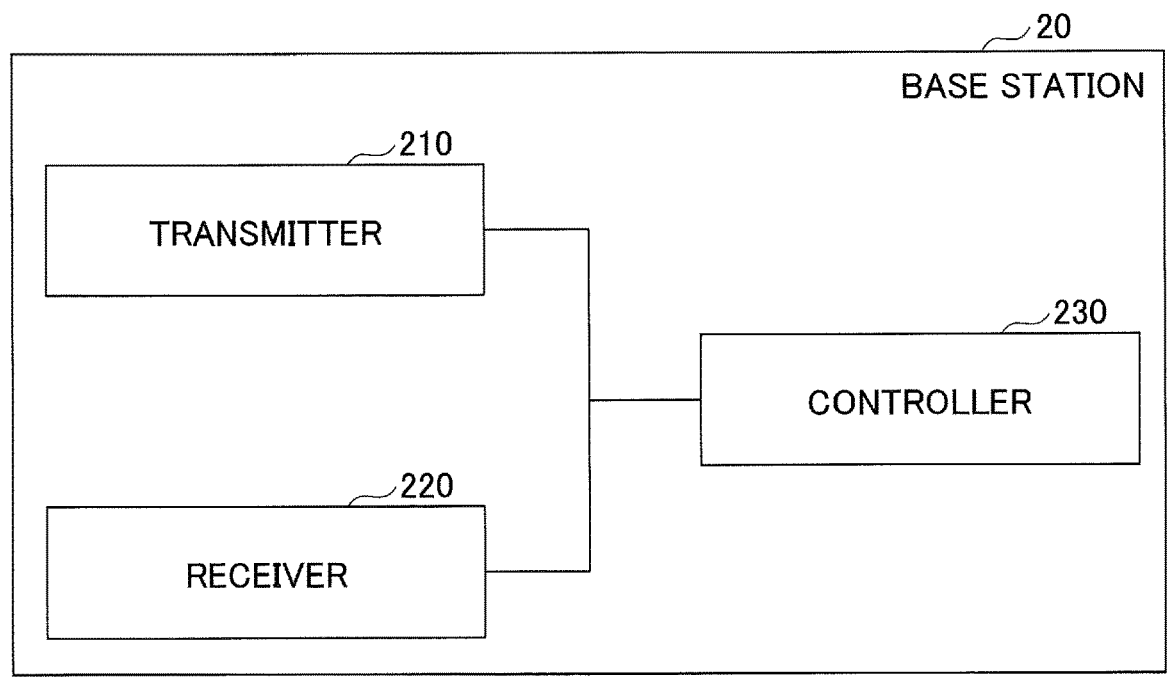
FIG. 12 is a diagram illustrating an example of a functional configuration of a base station.

FIG. 12 is a diagram illustrating an example of a functional configuration of the base station 20. As illustrated in FIG. 11, the base station 20 includes a transmitter 210, a receiver 220, and a controller 230. A functional configuration illustrated in FIG. 11 is illustrative only. A functional division and the names of the functional units may be any division and name as long as the operation according to the embodiments can be executed. Note that, the transmitter 210 may be referred to as a transmitter, and the receiver 220 may be referred to as a receiver.

The transmitter 210 includes a function of generating a signal to be transmitted to the terminal 10 side, and wirelessly transmitting the signal. The receiver 220 includes a function of receiving various signals transmitted from the terminal 10, and acquiring, for example, information of a higher layer from the received signals. In addition, the receiver 220 includes a measurement unit that performs measurement of a signal that is received to obtain received power or the like.

The controller 230 performs control of the base station 20. Note that, a function of the controller 230 which relates to transmission may be included in the transmitter 210, and a function of the controller 230 which relates to reception may be included in the receiver 220.

For example, in the frequency band from 52.6 GHz to 71 GHz, the controller 230 of the base station 20 may configure that the number of slots larger than 32 slots is set, as the value of the offset from the slot including the PDCCH to the slot including the PDSCH scheduled by the PDCCH when the Hybrid Automatic Repeat Request (HARQ) is operated. The controller 230 of the base station 20 may set the number of slots larger than 15 slots, as the offset value from the slot from which the PDSCH is transmitted to the slot in which the feedback corresponding to the PDSCH is received. In addition, the controller 230 of the base station 20 may set the number of slots larger than 32 slots, as an offset value from the slot including the PDCCH to the slot including the PUSCH when performing uplink scheduling. The controller 230 of the base station 20 may set a value greater than 16, as the HARQ process number per CC.

For example, in the frequency band from 52.6 GHz to 71 GHz, the controller 230 of the base station 20 may configure configuration information for changing the interpretation of the counter DAI and the total DAI in the Downlink Assignment Indicator (DAI) included in the control information transmitted from the transmitter 210 of the base station 20, and the transmitter 210 may transmit the configuration information to the terminal 10. The controller 230 of the base station 20 may include in the configuration information that the total DAI specifies the size of the codebook for transmitting the feedback information. Furthermore, the controller 230 of the base station 20 may include, in the configuration information, information for configuring the counter DAI as a counter for counting the number of times the DCI is received. For example, in the frequency band from 52.6 GHz to 71 GHz, the receiver 220 of the base station 20 may receive, from the terminal 10, information indicating whether the receiver 120 of the terminal 10 has detected DCI, on a per PDCCH monitoring occasion basis. The receiver 220 of the base station 20 may receive information indicating whether the terminal 10 has received DCI on a per PDCCH monitoring occasion basis. Here, the information is encoded separately from the HARQ-ACK for the data, and the information is multiplexed in the UCI. Furthermore, the receiver 220 of the base station 20 may receive a bitmap indicating whether the terminal 10 has been able to receive the PDCCH in each slot together with the HARQ-ACK codebook.

<Hardware Configuration>

The block diagrams (FIG. 11 and FIG. 12) which are used in description of the embodiments illustrate blocks in a functional unit. The functional blocks (components) are implemented by a combination of hardware and/or software. In addition, means for implementing respective functional blocks is not particularly limited. That is, the respective functional blocks may be implemented by one device in which a plurality of elements are physically and/or logically combined. In addition, two or more devices, which are physically and/or logically separated from each other, may be directly and/or indirectly connected (for example, in a wired manner and/or a wireless manner), and the respective functional blocks may be implemented by a plurality of the devices.

Figure 13:
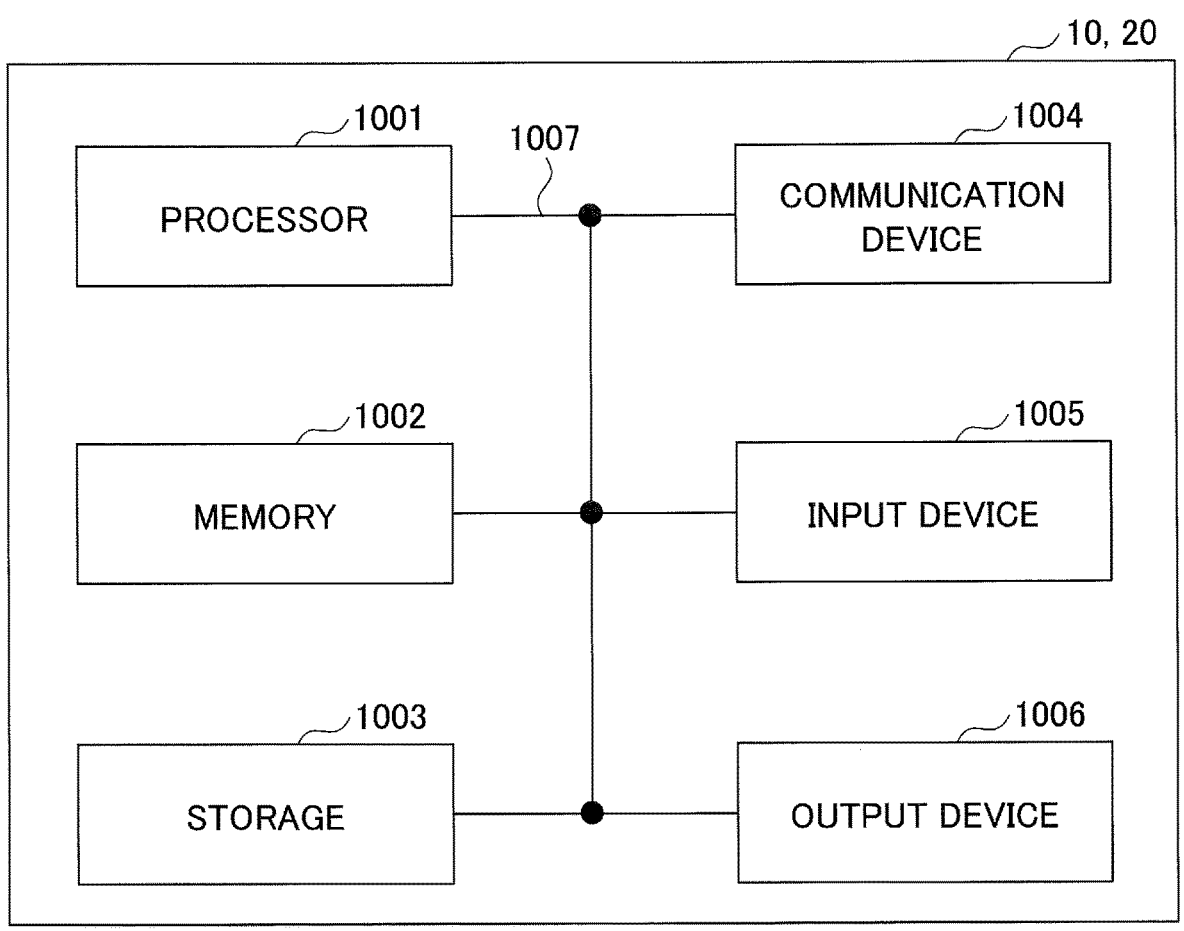
FIG. 13 is a diagram illustrating an example of a hardware configuration of the terminal 10 and the base station.

For example, each of the terminal 10 and the base station 20 according to an embodiment of the present invention may function as a computer performing the process according to the embodiments. FIG. 13 is a diagram illustrating an example of a hardware configuration of the terminal 10 and the base station 20 according to the embodiments. Each of the above-described terminal 10 and base station 20 may be physically configured as a computer device including a processor 1001, a memory 1002, an storage 1003, a communication unit 1004, an input unit 1005, an output unit 1006, a bus 1007, and the like.

In the following description, the term "device" can be replaced with a circuit, a device, a unit, or the like. The hardware configuration of the terminal 10 and the base station 20 may include one or more of the devices denoted by 1001-1006 in the figure, or may be configured without some devices.

Each function of the terminal 10 and the base station 20 is implemented by loading predetermined software (program) on hardware, such as the processor 1001 and the memory 1002, so that the processor 1001 performs computation and controls communication by the communication unit 1004, and reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and the like.

Additionally, the processor 1001 reads a program (program code), a software module, or data from the storage 1003 and/or the communication unit 1004 to the memory 1002, and executes various processes according to these. As the program, a program is used that causes a computer to execute at least a part of the operations described in the above-described embodiments. For example, the transmitter 110, the receiver 120, and the controller 130 of the terminal 10 illustrated in FIG. 11 may be implemented by a control program that is stored in the memory 1002 and that is operated by the processor 1001. Furthermore, for example, the transmitter 210, the receiver 220, and the controller 230 of the base station 20 illustrated in FIG. 12 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, or the like, which can be executed for implementing the process according to one embodiment of the present invention.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and the like. The storage 1003 may be referred to as an auxiliary storage device. The above-described storage medium may be, for example, a database including the memory 1002 and/or the storage 1003, a server, or any other suitable medium.

The communication unit 1004 is hardware (transmitting and receiving device) for performing communication between computers through a wired network and/or a wireless network, and is also referred to, for example, as a network device, a network controller, a network card, a communication module, or the like. For example, the transmitter 110 and the receiver 120 of the terminal 10 may be implemented by the communication unit 1004. Furthermore, the transmitter 210 and the receiver 220 of the base station 20 may be implemented by the communication unit 1004.

The input unit 1005 is an input device (e.g., a keyboard, a mouse, a microphone, a switch, a button, and/or a sensor) that receives an external input. The output unit 1006 is an output device (e.g., a display, a speaker, and/or an LED lamp) that performs output toward outside. The input unit 1005 and the output unit 1006 may be configured to be integrated (e.g., a touch panel).

Each device, such as the processor 1001 and the memory 1002, is also connected by the bus 1007 for communicating information. The bus 1007 may be formed of a single bus or may be formed of different buses between devices.

The terminal 10 and the base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented by at least one of these hardware components.

Conclusion of the Embodiments

In the specification, at least the terminal and the base station described below are disclosed.

A terminal including a receiver that receives configuration information transmitted from a base station in a high frequency band higher than or equal to a frequency band of a Frequency Range 2 (FR2) in a frequency range of a New Radio (NR) system formed of a Frequency Range 1 (FR1), which is a low frequency range, and the FR2, which is a high frequency range; and a controller that modifies, based on the configuration information, an interpretation of at least one of a counter DAI and a total DAI in a Downlink Assignment Indicator (DAI) included in control information to be received from the base station.

According to the above-described configuration, a mismatch on a recognition of a HARQ-ACK codebook size between the terminal and the base station can be avoided.

The controller may modify the interpretation of the total DAI to specify a size of a codebook for transmitting feedback information.

According to the above-described configuration, a mismatch on a recognition of a HARQ-ACK codebook size between the terminal and the base station can be avoided.

The controller may modify the interpretation of the counter DAI to count a true value of a number of times of receiving downlink control information.

According to the above-described configuration, a mismatch on a recognition of a HARQ-ACK codebook size between the terminal and the base station can be avoided.

The terminal may further include a transmitter that transmits a radio signal, the controller may create bitmap information indicating whether the receiver detects downlink control information on a per downlink control information monitoring occasion basis, and the transmitter may transmit the bitmap information.

According to the above-described configuration, the base station can detect information on reception of DCI by the terminal based on the bitmap information.

A base station including a controller that configures configuration information for modifying an interpretation of at least one of a counter DAI or a total DAI in a Downlink Assignment Indicator (DAI) included in control information to be transmitted from a base station in a high frequency band higher than or equal to a frequency band of a Frequency Range 2 in a frequency range of New Radio (NR) system formed of a Frequency Range 1 (FR1), which is a low frequency range, and the FR2, which is a high frequency range; and a transmitter that transmits the configuration information.

According to the above-described configuration, a mismatch on a recognition of a HARQ-ACK codebook size between the terminal and the base station can be avoided.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 10 and the base station 20 are described using the functional block diagrams, but such devices may be implemented by hardware, software, or a combination thereof. Software executed by the processor included in the terminal 10 according to the embodiments of the present invention and software executed by the processor included in the base station 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present specification and may be provided by any other method. For example, the notification of information may be provided by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present specification may be applied to Long Term Evolution (LTE), LTE-advanced (LTE-A), SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended based on these standards.

The processing procedures, the sequences, the flowcharts, and the like of the respective aspects/embodiments described in the present specification may be reversed in order provided that there is no contradiction. For example, the method described in the present specification presents elements of various steps with an exemplary order and is not limited to a presented specific order.

In the present specification, a specific operation to be performed by the base station 20 may be performed by an upper node in some cases. In the network including one or more network nodes including the base station 20, various operations performed for communication with the terminal 10 can be obviously performed by the base station 20 and/or any network node (for example, an MME, an S-GW, or the like is considered, but it is not limited thereto) other than the base station 20. A case is exemplified above in which there is one network node other than the base station 20. The one network node may be a combination of a plurality of other network nodes (e.g., MME and S-GW).

The aspects/embodiments described in this specification may be used alone, in combination, or switched with implementation.

The terminal 10 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station 20 may be defined by those skilled in the art as a NodeB (NB), enhanced node B (eNB), base station, gNB, or several appropriate terminologies.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not be assumed that the UE transmits and receives a predetermined signal/channel outside an active BWP. Further, a "cell," a "carrier," or the like in the present disclosure may be replaced with a "BWP."

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology. The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like. The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology. The slot may include a plurality of mini slots. Each mini slot may include one or more symbols in the time domain. Furthermore, the mini slot may be referred to as a sub-slot. The mini slot may include fewer symbols than a slot. A PDSCH (or PUSCH) transmitted in a unit of time greater than a mini slot may be referred to as a PDSCH (or PUSCH) mapping type A. A PDSCH (or PUSCH) transmitted using a mini slot may be referred to as a PDSCH (or PUSCH) mapping type B. Any one of a radio frame, a subframe, a slot, a mini slot, and a symbol indicates a time unit for transmitting a signal. As a radio frame, a subframe, a slot, a mini slot, and a symbol, different names corresponding to them may be used. For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station 20 performs scheduling of allocating a radio resource (a frequency bandwidth, a transmission power, or the like which can be used in each terminal 10) to each terminal 10 in units of TTIs. The definition of the TTI is not limited thereto. The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI. When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled. A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like. Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology. Furthermore, a time domain of an RB may include one or more symbols and may be a length of one slot, one mini slot, one subframe, or one TTI. One TTI, one subframe, or the like may be formed of one or more resource blocks. Furthermore, one or more RBs may be referred to as a physical resource block (PRB: Physical RB), a sub carrier group (SCG: Sub-Carrier Group), a resource element group (REG: Resource Element Group), a PRB pair, an RB pair, or the like. Furthermore, the resource block may be formed of one or more resource elements (RE: Resource Element). For example, one RE may be a radio resource region of one subcarrier and one symbol.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The description "based on" in this specification does not represent "only based on" unless otherwise stated. In other words, description of "based on" represents both "only based on" and "at least based on."

In this specification or the appended claims, in a case where "include," "including," and a modification thereof are used, these terms are intended as comprehensive terms similar to "comprising." In addition, a term "or" that is used in this specification and the appended claims is not intended as an exclusive OR.

In the entire present disclosure, for example, when an article such as "a," "an," and "the" in English is added by a translation, the article may include multiple things, unless the context explicitly indicates that the article does not include the multiple things.

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS 10 terminal
110 transmitter
120 receiver
130 controller
20 base station
210 transmitter
220 receiver
230 controller
1001 processor
1002 memory
1003 storage
1004 communication device
1005 input device
1006 output device

The invention claimed is:

1. A terminal comprising:
a receiver that receives a parameter indicating an offset value between time resources; and
a controller that determines, based on the parameter, a time resource to transmit or receive a specific channel,
wherein a difference value between a maximum value and a minimum value of a range of the offset value for a first subcarrier spacing is greater than a difference value between a maximum value and a minimum value of a range of the offset value for a second subcarrier spacing, the second subcarrier spacing being smaller than the first subcarrier spacing,
wherein each of the range of the offset value for the first subcarrier spacing and the range of the offset value for the second subcarrier spacing include at least two integer values, and
wherein the parameter indicates the range of the offset value for the first subcarrier spacing and the range of the offset value for the second subcarrier spacing.

2. The terminal according to claim 1, wherein the parameter is included in configuration information signaled by a Radio Resource Control (RRC) layer, and
wherein the controller determines the time resource to transmit or receive the specific channel based on the offset value indicated by the parameter included in the configuration information.

3. The terminal according to claim 1, wherein the parameter is included in downlink control information signalled by a physical layer, and
wherein the controller determines the time resource to transmit or receive the specific channel based on the offset value indicated by the parameter included in the downlink control information.

4. The terminal according to claim 1, wherein the specific channel is a downlink shared channel, and the offset value indicates an offset value from a time resource to receive the downlink control information to be used to schedule the downlink shared channel to a time resource to receive the downlink shared channel.

5. The terminal according to claim 1, wherein the specific channel is an uplink channel including feedback information for a downlink shared channel, and the offset value indicates an offset value from a time resource to receive the downlink shared channel to a time resource to transmit the uplink channel.

6. The terminal according to claim 1, wherein the specific channel is an uplink shared channel, and the offset value indicates an offset value from a time resource to receive the downlink control information to be used to schedule the uplink shared channel to a time resource to transmit the uplink shared channel.

* * * * *